(12) United States Patent
Long

(10) Patent No.: US 6,348,147 B1
(45) Date of Patent: Feb. 19, 2002

(54) FLUID FLOW SYSTEM FOR FLOATING BIOLOGICAL CONTACTOR

(75) Inventor: David G. Long, Fairport, NY (US)

(73) Assignee: FBC Technologies, Inc., Pittsford, NY (US)

( * ) Notice: Subject to any disclaimer, the term of this patent is extended or adjusted under 35 U.S.C. 154(b) by 0 days.

(21) Appl. No.: 09/583,803

(22) Filed: May 31, 2000

(51) Int. Cl.$^7$ ............................ C02F 3/06; C02F 3/20
(52) U.S. Cl. .............. 210/150; 210/170; 210/220; 210/242.2
(58) Field of Search ............... 210/150, 151, 210/170, 220, 242.1, 242.2

(56) References Cited

U.S. PATENT DOCUMENTS

| | | | |
|---|---|---|---|
| 3,957,634 A | 5/1976 | Orensten et al. ............ 210/11 |
| 3,966,599 A | 6/1976 | Burkhead ............ 210/14 |
| 4,137,171 A | * 1/1979 | Yokata ............ 210/150 |
| 4,308,137 A | 12/1981 | Freeman ............ 210/194 |
| 4,322,296 A | 3/1982 | Fan et al. ............ 210/610 |
| 4,350,589 A | * 9/1982 | Stog ............ 210/242.2 |
| 4,906,359 A | * 3/1990 | Cox, Jr. ............ 210/170 |
| 4,925,564 A | 5/1990 | Francis ............ 210/608 |
| 5,122,266 A | * 6/1992 | Kent ............ 210/242.2 |
| 5,202,027 A | * 4/1993 | Stuth ............ 210/151 |
| 5,227,067 A | 7/1993 | Runyon ............ 210/606 |
| 5,228,998 A | 7/1993 | DiClemente et al. ............ 210/610 |
| 5,294,340 A | * 3/1994 | Stog ............ 210/150 |
| 5,308,479 A | * 5/1994 | Iwai et al. ............ 210/151 |
| 5,344,557 A | * 9/1994 | Scanzillo ............ 210/170 |
| 5,454,938 A | 10/1995 | Doyle et al. ............ 210/106 |
| 5,478,473 A | * 12/1995 | Oshima ............ 210/150 |
| 5,507,950 A | * 4/1996 | Senda et al. ............ 210/150 |
| 5,549,828 A | 8/1996 | Ehrlich ............ 210/602 |
| 5,565,096 A | * 10/1996 | Phelan ............ 210/242.2 |
| 5,846,425 A | 12/1998 | Whiteman ............ 210/608 |
| 6,015,497 A | 1/2000 | Steen, Jr. ............ 210/618 |
| 6,019,110 A | 2/2000 | McClure et al. ............ 134/56 R |
| 6,022,476 A | 2/2000 | Hausin ............ 210/610 |

FOREIGN PATENT DOCUMENTS

| JP | 60-183096 | 9/1985 |
|---|---|---|

OTHER PUBLICATIONS

Advertisment for "Waterlink", Industrial Wastewater, Jul./Aug., p. 65.
Eckenfelder Jr., W. "Principles of Water Quality Management" pp. 216 and 218, 1980.*

* cited by examiner

Primary Examiner—Christopher Upton
(74) Attorney, Agent, or Firm—Eugene Stephens & Associates

(57) ABSTRACT

A floating biological contactor confining aerobic bacterial growth media in a container submerged in a wastewater lagoon provides fluid flow for bacteria growth by bubbling fine air bubbles upward through the media from diffusers arranged near the container bottom, which has openings allowing lagoon liquid to rise upward through the media with the air bubbles in a gentle circulational flow. Coarse bubble dispensers, also arranged under the media, deliver coarse bubbles during cleaning cycles for agitating the media to dislodge solid particles that settle downward though the bottom openings in the container.

16 Claims, 4 Drawing Sheets

FLUID FLOW SYSTEM FOR FLOATING BIOLOGICAL CONTACTOR

TECHNICAL FIELD

Biological contactors that float in wastewater lagoons and enclose and aerate media supporting growth of aerobic bacteria

BACKGROUND

Floating biological contactors such as shown in U.S. Pat. Nos. 5,228,998 and 6,022,476 are valuable in promoting growth of aerobic bacteria to consume organic solids in wastewater lagoons. Such contactors float in a lagoon where they confine a volume of bacteria supporting media in a submerged container. They also establish liquid flow and aeration to encourage aerobic bacteria growth on a large surface area of the submerged media.

Although previously known biological contactors have succeeded to some extent, they have consumed considerable energy and have required expensive maintenance so that their cost effectiveness has left room for improvement. This invention brings a needed improvement to floating biological contactors making them more efficient in sustaining growth of a large bacterial colony and less expensive to operate and maintain.

SUMMARY OF THE INVENTION

The inventive improvement to a floating biological contactor involves a better fluid flow system. First, the bottom of a submerged container confining aerobic bacteria growth media is provided with openings small enough to prevent the media from falling downward into the lagoon and large enough to allow liquid from the lagoon to flow upward through the openings and upward through the submerged media confined within the container above the openings. Walls of the container above the bottom also have openings allowing upflowing liquid to flow out through the walls and back into the lagoon. This allows a gentle flow of liquid that is preferably motivated by air bubbles rising from air diffusers arranged under the media in the region of the container bottom. Air bubbles rising from the diffusers draw or entrain liquid from below the container so that liquid moves upward through the container bottom to establish a gentle rising flow that circulates lagoon liquid through the media. The rising bubbles also provide the air necessary to help the aerobic bacteria grow and thrive on the extensive surface area of the confined media.

The bottom openings in the submerged media container also allow downward settlement of solid particles dropping downward from the media. Such solid particles can fall through the bottom openings and settle to the bottom of the lagoon.

Preferably, coarse bubble dispensers are also arranged under the media near the bottom of the container to drive coarse air bubbles up through the media during a cleaning cycle. The coarse air bubbles rise with sufficient force to agitate the media and knock loose solid particles that settle from the media and pass downward through the bottom openings of the container.

A compressor and an air delivery system preferably supplies the air necessary for both the fine bubble diffusers and the coarse bubble dispensers. Since more compressor capacity is necessary for coarse bubble agitation, a preferred compressor has more capacity than necessary for supplying only the fine bubble diffusers. This excess capacity is preferably used to deliver air to additional diffusers arranged outboard of the media chamber for aerating lagoon water in the vicinity of the float. A valving system switches the air flow between coarse bubble dispensers and fine bubble diffusers so that coarse bubbles are formed only during cleaning cycles.

DRAWINGS

DETAILED DESCRIPTION

Figure 1:
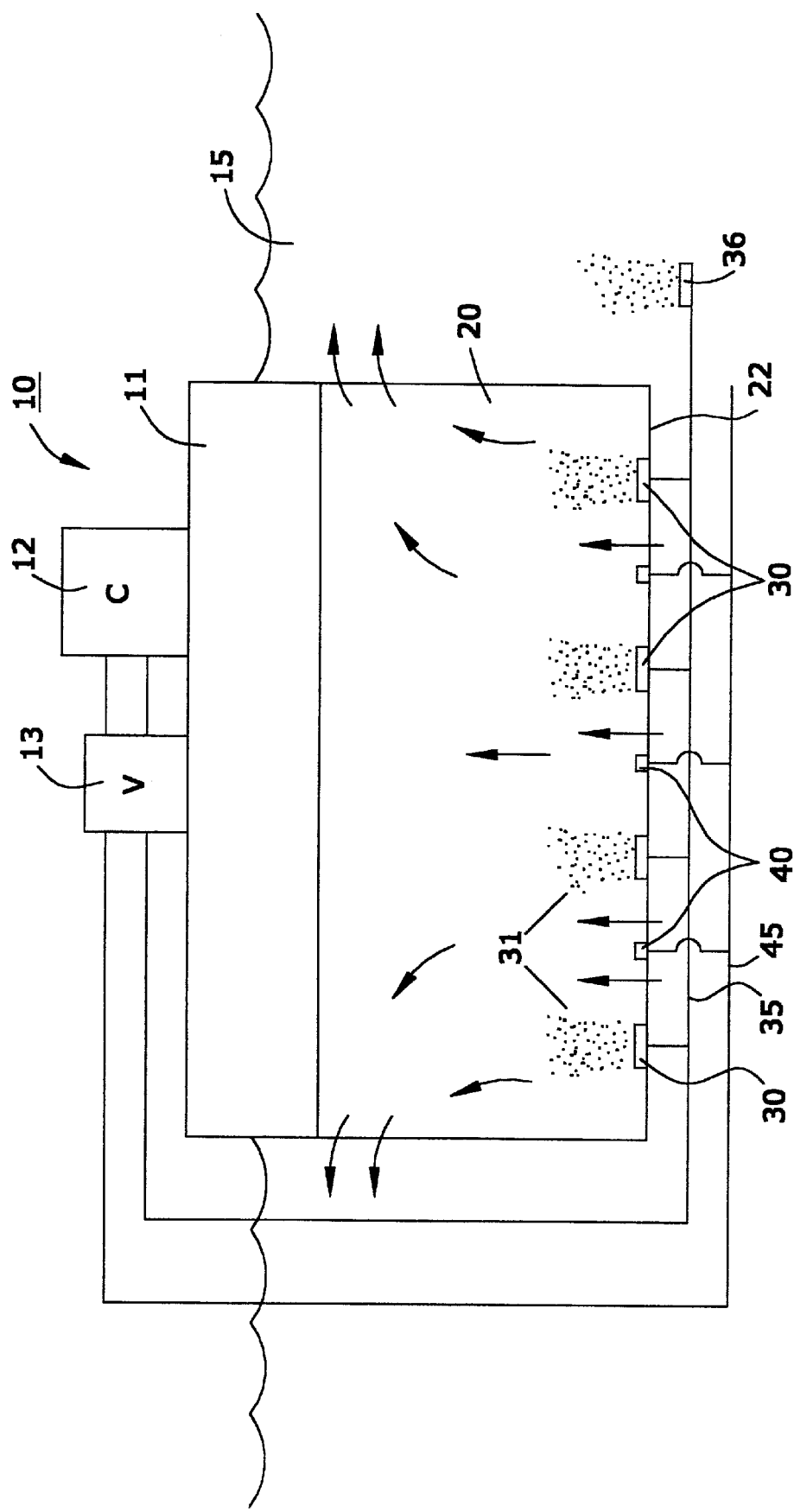
FIGS. 1 and 2 are schematic diagrams of a floating biological contactor having an improved fluid flow system according to the invention, with FIG. 1 schematically illustrating fine bubble diffusion and FIG. 2 schematically illustrating coarse bubble agitation for cleaning.
Figure 2:
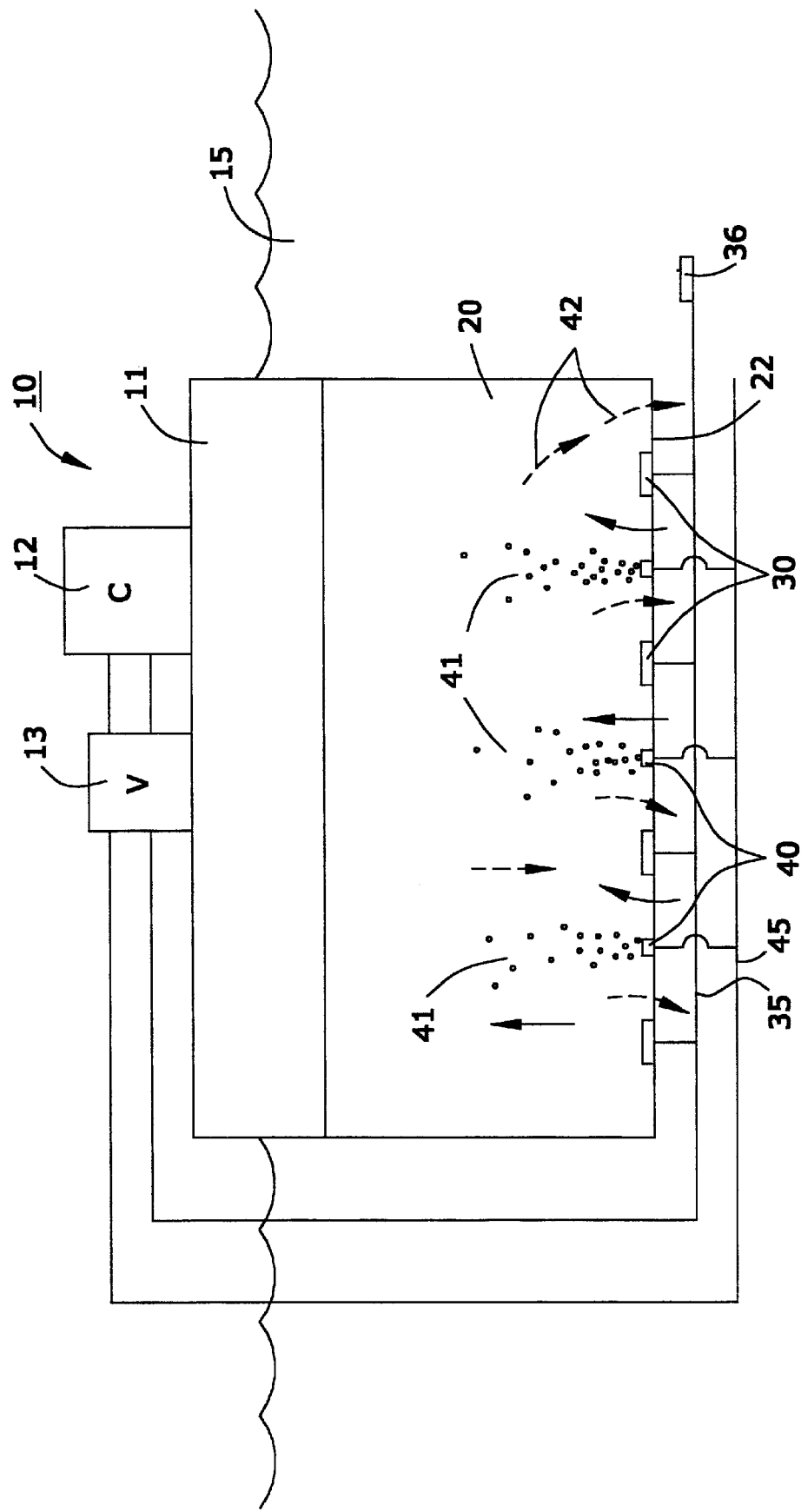

FIGS. 1 and 2 best show the improved fluid flow system for a biological contactor 10 that includes a float 11 supporting a compressor 12 and a valving system 13, all illustrated schematically for easier focus on the essentials. Submerged in lagoon 15 below float 11 is a container 20 holding a volume of media 25 having a large surface area supporting growth of aerobic bacteria. Media 25 appears schematically in FIG. 4 and are typically formed of small molded plastic bodies having large surface areas for the volume they occupy. Media 25 also allow easy flow of liquid and air, even when packed together in a confined space; and media 25 substantially fill container 20 below the level of lagoon 15.

Figure 3:
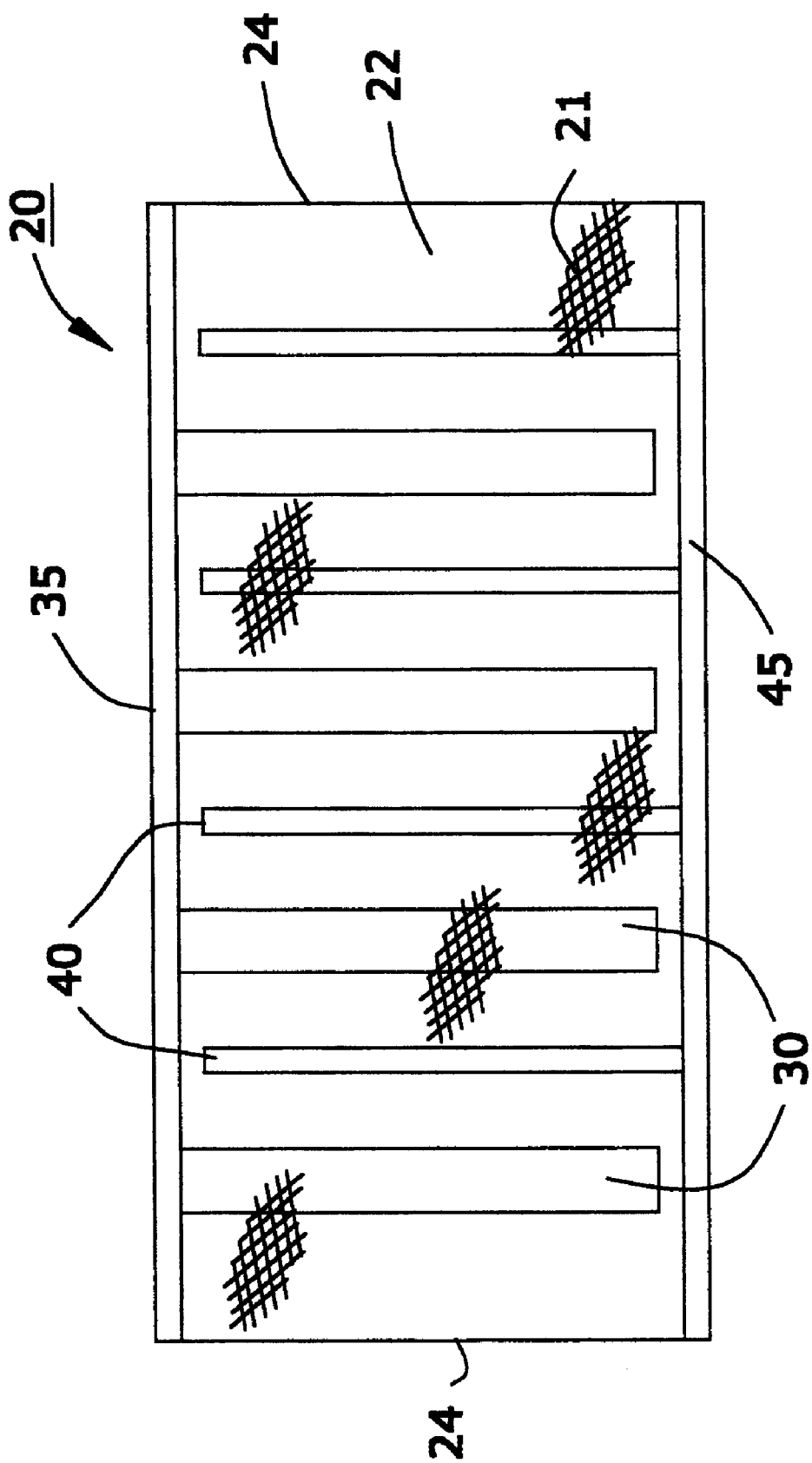
FIG. 3 is a partially schematic bottom view of a floating biological contactor according to the invention of FIGS. 1 and 2.

Container 20 has bottom openings 21 as schematically shown in FIG. 3. Openings 21 are preferably provided by using an expanded metal such as aluminum for the bottom of container 20. This provides openings small enough to prevent media 25 from falling through the bottom of container 20 but large enough to allow liquid to flow upward from lagoon 15 up through container bottom 22.

Container 20 also has openings 23 above bottom 22, and these are preferably formed in end walls 24 of container 20. Openings 23 are also preferably provided by using expanded metal for end walls 24 of container 20, and openings 23 are preferably arranged at least in upper regions of end walls 24 above container bottom 22. Openings can also be provided in side walls of container 20 if desired; and again, these can be formed by use of expanded metal. Openings 23 above bottom 22 allow liquid rising up through media 25 to flow back out through openings 23 into lagoon 15.

The motivating force causing liquid from lagoon 15 to rise up through openings 21 in container bottom 22 is provided by fine air bubbles 31 rising from diffusers 30 that are arranged under media 25 near container bottom 22. Compressor 12 supplies air to diffusers 30 via valve system 13 to form fine bubbles 31 that rise upward through the liquid and the media 25 in a submerged portion of container 20. The upward flow of bubbles 31 draws or entrains liquid to flow upward with the bubbles, which draws liquid from lagoon 15 up through bottom openings 21 to rise with bubbles 31 as illustrated in FIG. 1. Rising bubbles 31 dissolve in the liquid as they rise, and some of the bubbles 31 may reach the surface of lagoon 15 above media 25. The liquid rising with bubbles 31 flows back into lagoon 15 through end or side wall openings 23 after having risen up through container bottom 22.

The circulational flow established by air bubbles 31 rising from diffusers 30 supplies a gentle liquid flow through the submerged media 25 and also provides oxygen from the air bubbles to nourish aerobic bacteria growing on the extensive surface area of media 25. This circulational flow furnishes the aerobic bacteria with nutriments from the water in lagoon 15 and provides the necessary oxygen for the bacteria to thrive. In this way, the bacteria consume organic solids within lagoon 15 and help purify the water there.

During cleaning cycles that preferably occur periodically, air from compressor 12 is delivered via valve system 13 to coarse bubble dispensers 40 that form coarse or larger air bubbles 41 as illustrated in FIG. 2. Coarse bubble dispensers 40 are also arranged under media 25 in the region of container bottom 22 so that coarse bubbles 41 rise up through media 25 with sufficient turbulence to agitate media 25 and the surrounding liquid. This knocks loose particles of solid material from the aerobic bacteria colonies on the surfaces of media 25; and such dislodged solid particles, as represented by broken line arrows 42 in FIG. 2, settle downward through media 25 and pass down through openings 21 in container bottom 22 to settle into lagoon 15. Bottom openings 21 thus afford a passage for dislodged solid particles to settle out of container 20 and down to the bottom of lagoon 15, without requiring removal of container 20 from lagoon 15 for cleaning purposes.

Fine bubble diffusers 30 and coarse bubble dispensers 40 can be arranged either above or below container bottom 22, but just above container bottom 22 and below media 25 is the preferred location. There, diffusers 30 and dispensers 40 are safely arranged within container 20 where they are not damaged during shipment and launching of contactor 10.

Figure 4:
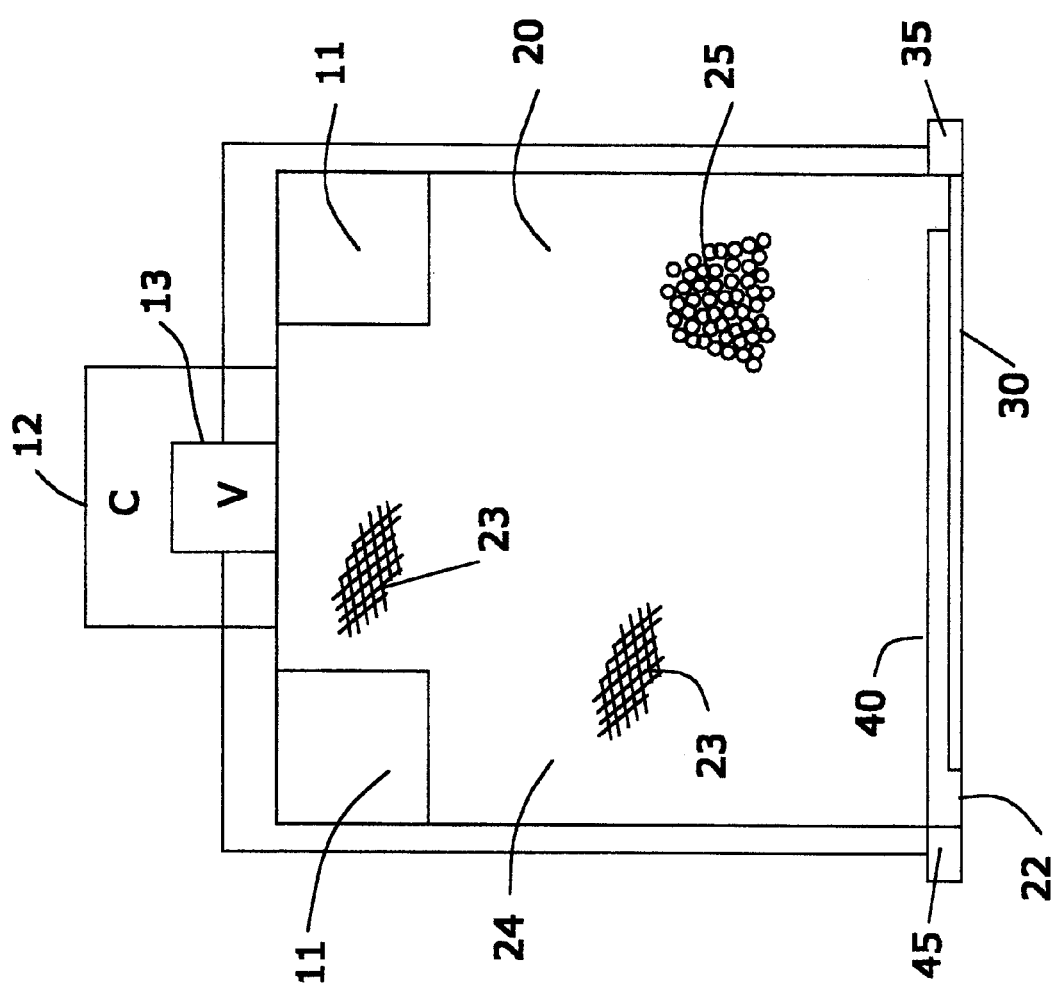
FIG. 4 is a partially schematic end view of the floating biological contactor of FIG. 3.

As schematically shown in FIGS. 3 and 4, a manifold 35 can be arranged to receive air from valving system 13 for delivery uniformly to a number of fine bubble diffusers 30 arranged along the bottom 22 of container 20. A similar manifold 45 can be arranged to deliver air from valving system 13 to coarse bubble dispensers 40. Valving system 13 switches between manifolds 35 and 45 so that air is shut off to fine bubble diffusers 30 when coarse bubble dispensers 40 are operating.

To produce coarse bubbles 41 with sufficient size and turbulence to agitate media 25 and accomplish cleaning away of solid particles from the bacteria colony requires more capacity of compressor 12 than is necessary while operating only fine bubble diffusers 30. This excess capacity is preferably used, as shown in FIG. 1, to deliver air to additional fine bubble diffusers 36 arranged outboard of chamber 20 in lagoon 15. Diffusers 36 can be arranged under additional floats moored near chamber 20 or supported by structures extending outboard of chamber 20. Additional air bubbles delivered by additional fine bubble diffusers 36 help support growth of aerobic bacteria in lagoon water near contactor 10.

I claim:

1. A biological contactor using aerobic bacteria growth media confined in a submerged region of a container supported by a float in a wastewater treatment lagoon, the contactor comprising:

a. the container holding the media having a bottom provided with openings small enough to prevent the media from falling downward through the openings and large enough to allow liquid from the lagoon to flow upward through the openings and upward through the submerged media;

b. walls of the container above the bottom having openings allowing liquid flowing upward through the media to flow out through the walls and into the lagoon;

c. the bottom openings allowing downward settlement of solid particles dislodged from the media so that the solid particles can fall through the bottom openings and settle to a bottom of the lagoon;

d. fine bubble air diffusers arranged under the media in the region of the container bottom to emit air bubbles that rise through the media and thereby cause an upflow of a mixture of air bubbles and liquid drawn upward from below the container through the bottom openings so that the liquid and air bubbles rise up through the media within the container before the liquid flows out through the container walls and back into the lagoon; and e. coarse bubble dispensers arranged under the media in a region of the container bottom to emit coarse bubbles that rise up through the media causing sufficient turbulence to agitate the media and dislodge the solid particles from the media during a cleaning cycle.

2. The contactor of claim 1 including a compressor and an air delivery system arranged for delivering air alternately to the fine bubble diffusers and to the coarse bubble dispensers.

3. The contactor of claim 2 including outboard diffusers submerged in the lagoon outside the container and arranged for receiving air from the compressor during intervals when the compressor is not delivering air to the coarse bubble dispensers.

4. The contactor of claim 1 wherein the container bottom is formed of expanded metal providing the bottom openings.

5. In a biological contactor floating in a wastewater lagoon so as to confine aerobic bacteria growth media within a container submerged beneath the float, an improvement comprising:

a. a bottom of the container having openings allowing upflow of liquid through the bottom openings and up through the media within the container;

b. a plurality of fine bubble diffusers arranged under the media near the container bottom;

c. an air delivery system supplying air to the fine bubble diffusers so that bubbles rise from the diffusers up through the media and cause liquid from the lagoon under the container bottom to flow up through the bottom openings and up through the media along with the rising air bubbles;

d. a plurality of coarse bubble dispensers arranged under the media near the container bottom;

e. the air delivery system being arranged to supply air to the coarse bubble dispensers to emit coarse bubbles that rise up through the media with sufficient turbulence to agitate the media and dislodge solid waste particles from the media during cleaning cycles; and f. the bottom openings in the container allowing the dislodged solid particles to pass downward through the bottom openings and settle in the lagoon.

6. The improvement of claim 5 including outboard diffusers submerged outside the container near the float, and the air delivery system being arranged for delivering air to the outboard diffusers during intervals when air is not delivered to the coarse bubble dispensers.

7. The improvement of claim 6 wherein the air delivery system includes a compressor and a switching arrangement for directing air from the compressor either to the coarse bubble dispensers or to the diffusers.

8. The improvement of claim 5 wherein the container bottom is formed of expanded metal providing the bottom openings.

9. A combination facilitating cleaning of a biological contactor using aerobic bacteria growth media confined within a container submerged under a float in a wastewater lagoon, the combination comprising:

a. a bottom of the container having openings allowing liquid from below the bottom to rise through the bottom and upward through the media, while preventing the media from falling downward through the openings;

b. coarse bubble dispensers arranged under the media near the container bottom and supplied with air forming coarse bubbles that rise upward through the media causing sufficient turbulence to agitate the media and dislodge solid particles from the media during a cleaning cycle;

c. the bottom openings in the container allowing the dislodged solid particles to fall downward through the bottom and settle in the lagoon; and d. fine bubble diffusers arranged under the media and supplied with air to form fine bubbles that rise up through the media within the container and cause liquid from the lagoon below the container bottom to rise upward through the bottom openings and flow upward through the media with the fine bubbles.

10. The combination of claim 9 wherein the bottom of the container is formed of expanded metal providing the bottom openings.

11. The combination of claim 9 including a compressor and an air delivery system that alternately supplies air to the coarse bubble dispensers and to the fine bubble diffusers.

12. The combination of claim 11 including submerged fine bubble diffusers receiving air from the delivery system for aerating the lagoon in the vicinity of the container when air is not being delivered to the coarse bubble dispensers.

13. A system of flowing fluid through a biological contactor using aerobic bacteria growth media confined within a container submerged under a float in a wastewater lagoon, the fluid flow system comprising:

a. fine bubble diffusers supplied with air to flow air bubbles upward from a region near the bottom of the container so that air bubbles rise through the media to a liquid surface above the media;

b. the rising air bubbles entraining liquid to rise with the bubbles through the media so that liquid is drawn from the lagoon below the container bottom and rises through openings in the container bottom and flows upward through the media along with the air bubbles until the liquid flows outward through walls of the container and back into the lagoon after rising through the media with the air bubbles; and c. coarse bubble dispensers supplied with air to flow coarse bubbles upward from a region near the bottom of the container so that the coarse bubbles rise through the media causing sufficient turbulence to dislodge solid waste particles from the media during a cleaning cycle.

14. The system of claim 13 including a compressor and an air delivery system for delivering air alternately to the fine bubble diffusers and to the coarse bubble dispensers.

15. The system of claim 14 including submerged diffusers outboard of the container supplied with air for aerating lagoon water when coarse bubbles are not being generated.

16. The system of claim 13 wherein the bottom openings of the container allow settling of the dislodged solid particles through the container bottom and down into the lagoon.

* * * * *